(12) United States Patent
Maes

(10) Patent No.: US 7,996,467 B2
(45) Date of Patent: Aug. 9, 2011

(54) TECHNIQUES FOR APPLYING POLICIES FOR REAL TIME COLLABORATION

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 397 days.

(21) Appl. No.: 11/512,613

(22) Filed: Aug. 29, 2006

(65) Prior Publication Data

US 2008/0059579 A1    Mar. 6, 2008

(51) Int. Cl.
*G06F 15/16*  (2006.01)
*G06F 15/173*  (2006.01)

(52) U.S. Cl. ......... 709/204; 709/230; 709/223; 709/206

(58) Field of Classification Search .................. 709/204, 709/206, 207, 223, 230; 715/746, 727, 728, 715/729; 706/45, 47

See application file for complete search history.

(56) References Cited

U.S. PATENT DOCUMENTS

| | | | |
|---|---|---|---|
| 6,782,413 B1 * | 8/2004 | Loveland | 709/204 |
| 6,895,558 B1 * | 5/2005 | Loveland | 715/746 |
| 7,124,123 B1 * | 10/2006 | Roskind et al. | 706/60 |
| 7,171,190 B2 | 1/2007 | Ye et al. | |
| 2002/0188688 A1 * | 12/2002 | Bice et al. | 709/206 |
| 2003/0229722 A1 * | 12/2003 | Beyda | 709/310 |

* cited by examiner

*Primary Examiner* — Wing F Chan
*Assistant Examiner* — Ruolei Zong
(74) *Attorney, Agent, or Firm* — Kilpatrick Townsend & Stockton LLP

(57) ABSTRACT

When a communication is received for a user, an appropriate policy can be determined and applied to the communication. For example, a policy can be applied if the user is not present at the appropriate client. A policy can be applied based upon information for the communication, and can include one or more conditions and one or more actions. Depending on the conditions that are satisfied, at least one action is determined and executed for the communication.

13 Claims, 6 Drawing Sheets

TECHNIQUES FOR APPLYING POLICIES FOR REAL TIME COLLABORATION

BACKGROUND OF THE INVENTION

Embodiments of the present invention generally relate to communications and real-time collaboration, and more specifically to applying policies to such communications or collaboration.

For example, communications such as instant messaging (IM) provide real-time communications between users. IM provides a convenient way for a user to contact another user. When an IM session is initialized, users may communicate and interact in real time by sending messages using their IM clients.

Instant messaging is very convenient when users are active and connected to their IM clients. However, when a user is absent, current solutions that deal with the absent user are inadequate. A user in some IM systems has the ability to leave a status message when that user is connected to the IM system but away from the computer or otherwise unable or unwilling to respond to messages through the IM system. For example, when a user sets a status to away, idle, or any other non-active status, the IM client may respond to an instant message received for the user by sending a standardized message back to a sender, indicating the status of the user. These messages may be personalized by a user. However, these messages are sent just based on the presence of the user. The messages therefore only show or hide the presence of a user in a way that is consistent, using a global setting to specify how to handle every request received. For example, the system can be set to indicate to everyone or no one that the user is away using a single status attribute or permanent setting (such as never indicating that the user is away).

When a user is not connected the options typically are even more limited. For example, when a sender sends a message to a user that is offline, the sender can receive an error message or a message indicating that the intended recipient appears to be offline and may not receive the message, and/or the message can be buffered for possible delivery to the user when the user subsequently connects. Messages that are buffered may be inadvertently deleted when the user connects again, such as where the user shuts down when coming back to the computer or messaging device without checking the messages, or may not be delivered at all. Further, if the messages are important, there is no mechanism such that the user can be notified of the messages until the user logs on again, checks messages, or reconnects.

BRIEF SUMMARY OF THE INVENTION

Embodiments in accordance with the present invention generally relate to applying policies to communications and real-time collaboration. Such policies can be applied to any appropriate communication and/or collaboration technology, such as may include instant messaging, e-mail, short messaging service (SMS), multimedia messaging service (MMS), voicemail, Push to Talk (PTT), Push to Talk Over Cellular (PoC), chat, voice chat, video chat, Web conferencing, push e-mail, phone/voice/multimedia calls (including multimedia SIP invites), faxing, multimedia conferencing, and any of a number of other such technologies known or used in the art.

In an instant messaging (IM) embodiment, an instant message is received for the user. It is determined if a policy should be applied to the instant message. For example, if a user is away or not connected, then a policy may be applied. If a policy should be applied, information to apply the policy is determined based on the instant message. The information is applied to the policy where the policy includes a set of one or more conditions and one or more actions. Depending on the one or more conditions that are satisfied, one or more actions may be determined. Once an action is determined, that action is performed.

Such policies can provide a powerful tool for communications and real-time collaboration technologies. Conditions and/or actions can be specified and personalized for the user, and can be applied dynamically. The use of conditions may be more robust than just depending on the status of a user. The policies also can provide more robust processing of messages and communications by ensuring that the communications are not lost and are received according to at least one policy.

Policies can be set to determine any of a number of aspects of messaging or collaboration. For example, a policy can determine how a message is routed, as well as what is fed back to the sender. In one embodiment, a sender of a message to a recipient that is not available can receive a message indicating a suggestion as to how to reach the intended recipient, or receive a message indicating how the message will be processed, such as by sending a notification to the intended recipient, allowing the recipient to check later, etc. The policies can be any combination of a condition and an action, for example, and can be enforced in any appropriate manner.

In one embodiment, when a communication is received for an intended recipient, information for the communication is analyzed to determine whether to apply a policy to the communication. If a policy is to be applied, a policy is selected to apply to the communication, the policy including at least one condition and at least one action. The policy then is applied to the communication, whereby at least one condition is satisfied. The action corresponding to the satisfied condition then is executed. If a policy is not to be applied, the communication is forwarded to the intended recipient.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Figure 1A:
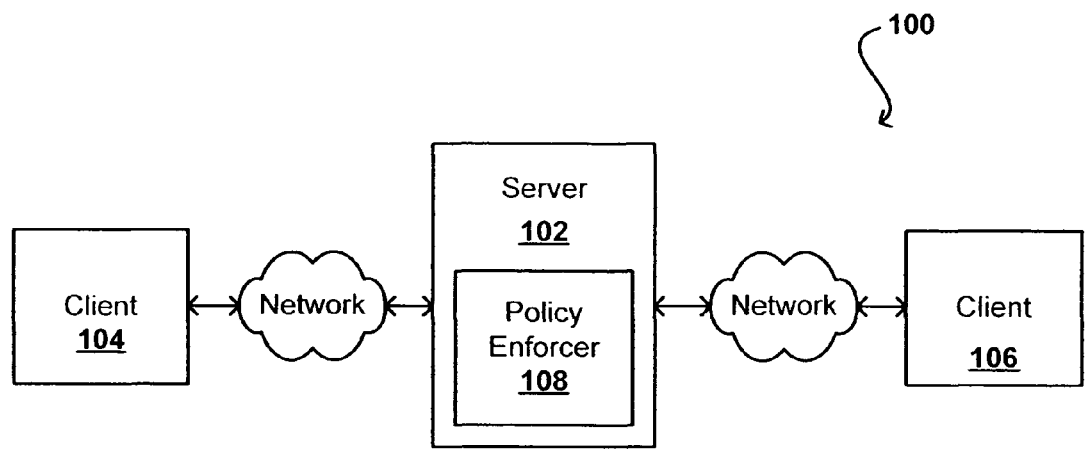
FIGS. 1(a) and 1(b) illustrate systems for applying policies to instant messages in accordance with one embodiment of the present invention.
Figure 1B:
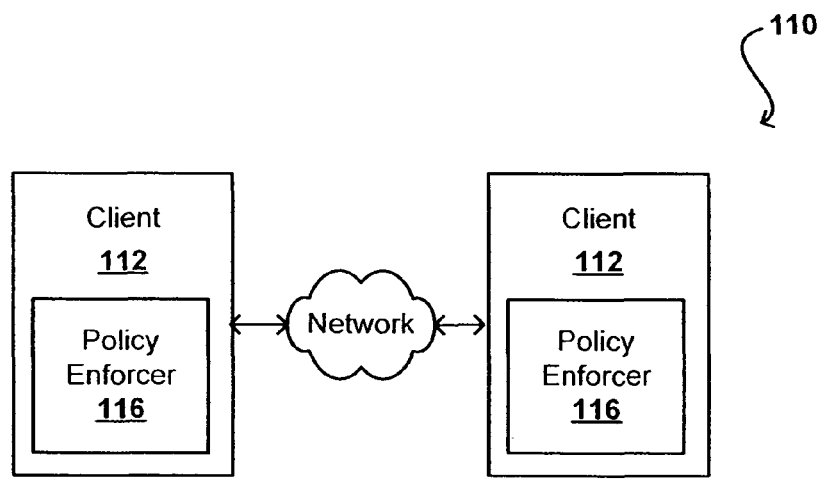

FIGS. 1(a) and 1(b) depict exemplary systems 100, 110 for applying policies to a communication system according to one embodiment of the present invention. While these systems will be described with respect to a computer network-implemented system, such as an instant messaging system including clients and servers as known in the art, other variations and systems are possible as would be apparent to one of ordinary skill in the art in light of the teachings and suggestions contained herein. In the system 100 of FIG. 1(*a*), a communication server 102, a first communication client 104, and a second communication client 106 are provided, which communicate through the communication server 102. It will be understood that any number of can be used with such a system, and methods for allowing the servers to cooperate, including aggregation, replication, and cascading techniques, are known in the art and will not be discussed in detail herein.

In the system 110 of FIG. 1(*b*), a first client 112 and second client 114 communicate directly through a peer-to-peer connection as known in the art. Each client 112, 114 can have a policy enforcer instance 116, 118 as discussed later herein.

The clients in either system can be appropriate client capable of sending and receiving communications or otherwise collaborating. For example, IM clients may include proprietary solutions (e.g., AOL AIM, Yahoo! Instant Messenger, MSN Messenger), public IM clients (MIRC, Unix Talk) or standard IM clients (Wireless Village/IMPS, XMPP, SIP/SIMPLE/MRCP) as known in the art. The clients can be configured to exchange communications or collaboration information with other clients by any appropriate mechanism, such as via the server or peer to peer as known in the art. The clients can be run any appropriate computing, processing, or communication device, such as a personal computer, personal digital assistant (PDA), cellular telephone, multimedia phone, etc.

The server 102 in FIG. 1(*a*) can be any appropriate computing, routing, or processing device configured to route messages, communications, or collaboration information. For example, the communication server 102 can be a server found in a computerized network that is configured to route messages to computerized clients, and can be a computing device that is also running a client. Further, although a policy enforcer 108 is shown as being found in the server 102, it will be appreciated that the policy enforcer 108 can be included on any device, such as a computer running either of the client instances 104, 106.

The policy enforcer 108 can be configured to apply policies to any communications between a client 104, 106 and the server 102. In one embodiment, the policy enforcer can intercept the communication, select the appropriate policy for the intercepted communication, then enforce the appropriate policy. The policy can include at least one condition and at least one action, and can include a set of conditions and actions. When one or more conditions are satisfied, the corresponding actions may be performed by policy enforcer 108.

In the peer to peer system 110, the policy enforcer can be part of at least one of the clients in for communication or collaboration. Each policy enforcer can be configured to apply policies to any incoming and/or outgoing communication for the respective client.

In one embodiment, a policy is applied when a user is absent and not connected with the client for that user. However, it will be understood that the policy may be applied for any appropriate conditions. The policy can be applied using information from the communication, and can be personalized by a user. The policy also can be a function of the sender or context (e.g., time of day) of the communication. Thus, more power is provided to a user than just having a communication sent based on the status of a user. In one example, a policy can execute a script, based on the combination of conditions, determine which actions execute. These conditions and actions may be personalized by a user. This provides a more efficient and customizable processing of communications.

The presence of a communication system itself also can be subject to policies. Whenever a presence communication (e.g., subscribe, notify, publish) is received, policy enforcement can be performed based on factors such as the nature of the message, the sender, the recipient, and the target. The policy enforcement can result in changing presence status or attributes for different principals.

The use of policies can allow a user to provide detailed information to a sender as to what is happening with the recipient. In a simple case, the action returns a detailed message to the sender and stores the incoming message or forwards the message to another channel (e.g., email/SMS) with an adaptation (e.g. transcoding).

Functionality then can be added to messaging as is similar to what is used with voice communications, such as where a user can leave a message to a voicemail system and can be informed by the voicemail greetings of what the user should do. The message then can be delivered later to the user with ways to determine that the message has been delivered. The user intended recipient also can be notified about the message. Another example is the concept of find me/hunting messages. If a user on a communication or collaboration system is offline, such as where a status is set or the user really is not present, the policy can specify where to send a message or notification, such as to which channel, in what order, etc. In an example where a server sends an urgent message to a push email system, if the intended recipient does not read or retrieve the message and update the status or cause a notification to be sent, it is possible to subsequently send a notification, message, or other communication through a separate communication channel. Adaptation for such purposes can be implemented as described in U.S. patent application Ser. No. 10/684,686, entitled "Intelligent Messaging", filed Oct. 13, 2003, which is hereby incorporated herein by reference.

Figure 2:
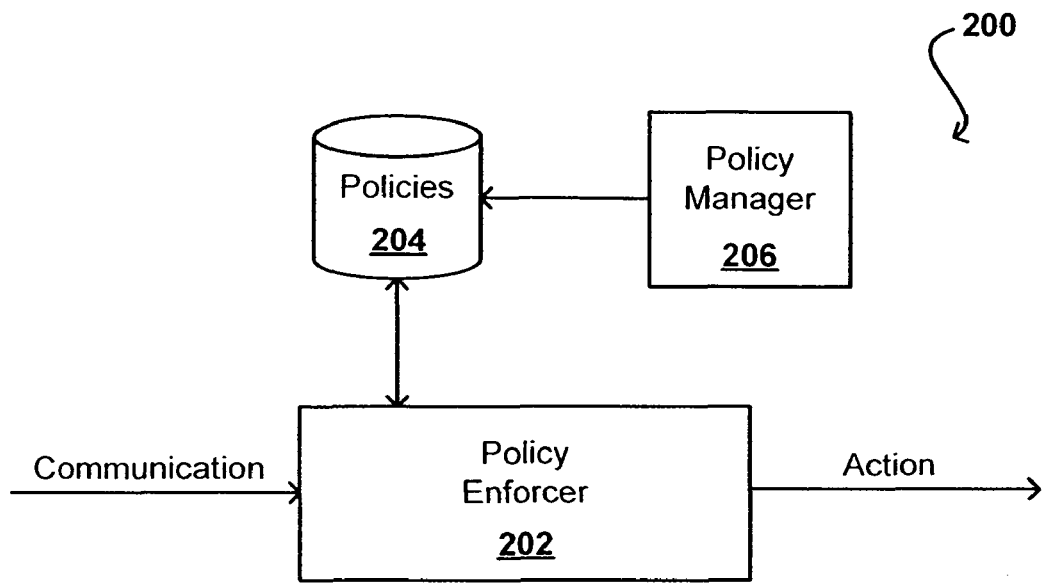
FIG. 2 illustrates an arrangement including policy enforcer in accordance with one embodiment of the present invention.

FIG. 2 illustrates an arrangement 200 including a policy enforcer 202 in accordance with one embodiment of the present invention. The policy enforcer 202 is configured to evaluate conditions and execute actions in a selected policy. The selection of a policy from a set of policies 204 stored in an accessible location can be part of the evaluation of conditions. Also, a policy manager 206 can be used that allows for the updating, editing, and managing of the various policies 204 by any authorized principal (e.g., an administrator, user or agent).

The policy enforcer 202 can decide whether a policy should be applied to a communication. For example, a user may have a policy applied to communications when the user is not online or absent (e.g., the status is set to idle, away, or any other status). The policy enforcer 202 can detect the status of the appropriate client and determine whether to apply a policy to the communication. In other embodiments, the policy determiner 202 can apply policies based on other factors, such as the identity of the sender, the time of the day, the content of the message (e.g., whether the message is deemed important, whether the message contains unwanted content, or whether the communication contains problematic content such as a virus, spam, spyware, executable scripts, etc.), or any other appropriate information. Also, the user may decide to apply a policy on every communication message that is sent.

If a policy should be applied, the policy enforcer 202 can retrieve a policy from a policy storage 204. Multiple policies may be stored for multiple users. Or, in other embodiments, standard policies may be applied for more than one user. In one embodiment, policies may be indexed by users and retrieved based on the recipient for the communication. Any other set of conditions to evaluate also can be used. The communication and policy are then processed with other conditions evaluated and actions executed.

The policy enforcer can be configured to determine at least one action to take based on the communication and policy. In one embodiment, the policy enforcer determines information to apply to the policy. The policy may be a logical combination of conditions to be satisfied and actions to be executed. Each policy may be composed of multiple policies, which further evaluate conditions and/or perform actions. The policies may be programs, program components, or any other type of machine-executable instructions.

The policy enforcer can first determine information that should be applied to the policy. For example, the policy may specify that the recipient, some content of the communication, the status of the recipient, or any other information should be applied to conditions in the policy. In one embodiment, information other than the status of the recipient is used in order to determine the action.

When the information is run through the policy and conditions are satisfied through a logical combination, one or more actions can be determined. For example, when certain conditions are satisfied, a logical combination leads to one or more actions to be performed.

Many different actions may be performed. For example, a may display a different status. Instead of appearing offline when a communication is received, the status may be changed to appear "online," or a status of "away" may be used. In this case, the user may be able to keep sending messages to the recipient and those messages may be stored. Also, a message may be sent to tell the sender that messages will be cached and sent to the recipient when the recipient returns.

Another action may be responding to the communication. For example, the answer may be provided based on the content of the communication. The content of the communication may be parsed and if standard search words are determined, standard answers may be provided. For example, for a business, if the question, "What are your hours?" is sent, a standard answer may be the hours for the business. Also, other answers may indicate the status of the user, such as, "The user is away from the computer, but you can keep sending messages and they will be stored". This answer may depend on who sent the communication and also the status of the user. For example, if the sender is determined to be the manager of the recipient, a communication may be sent back stating that "the recipient is working on a project and will be available by cell phone."

Other actions include sending a communication e through another channel, such as through email, voicemail, a cellular phone call, IM, a PSTN phone call, or through an intelligent server that can determine which channel is the best channel for a user to receive the communication. The voicemail or phone calls may be provided using a voice translation of the text of the instant message. Other actions may include sending communications to another communication system, such as from sending an instant message from a corporate IM client to a public IM client, such as AOL. A message may be sent back to the user stating that the user should try to contact the recipient at other places, such as through a cellular phone number, or an email. Also, a message may be left for the sender. For example, a message may be sent back to the sender saying, "please try to call me."

When the action is determined, the action is performed by the policy enforcer 202. In addition to performing the action, the policy enforcer may keep the conversation active until the recipient connects or logs on to the client. For example, the communications may be saved and displayed to the user at a later time.

Policies stored in the policy storage 204 may be updated and managed by a user. For example, a policy manager 206 may be used to dynamically update policies. A user may use a client to specify updates to the policies through the policy manager. Also, updates to the policies may be provided through other channels, such as through email, web pages, SMS, etc. Accordingly, users may personalize a policy by specifying various conditions and actions to be performed if the conditions are met. This provides a flexible approach for applying policies. This is more powerful than conventional methods that just allow the user to set a status and a message that will be sent based on the status. The providing of conditions and actions to be performed for those conditions are met allows the user to specify other items than status that may be used in order to determine actions to take.

Figure 3:
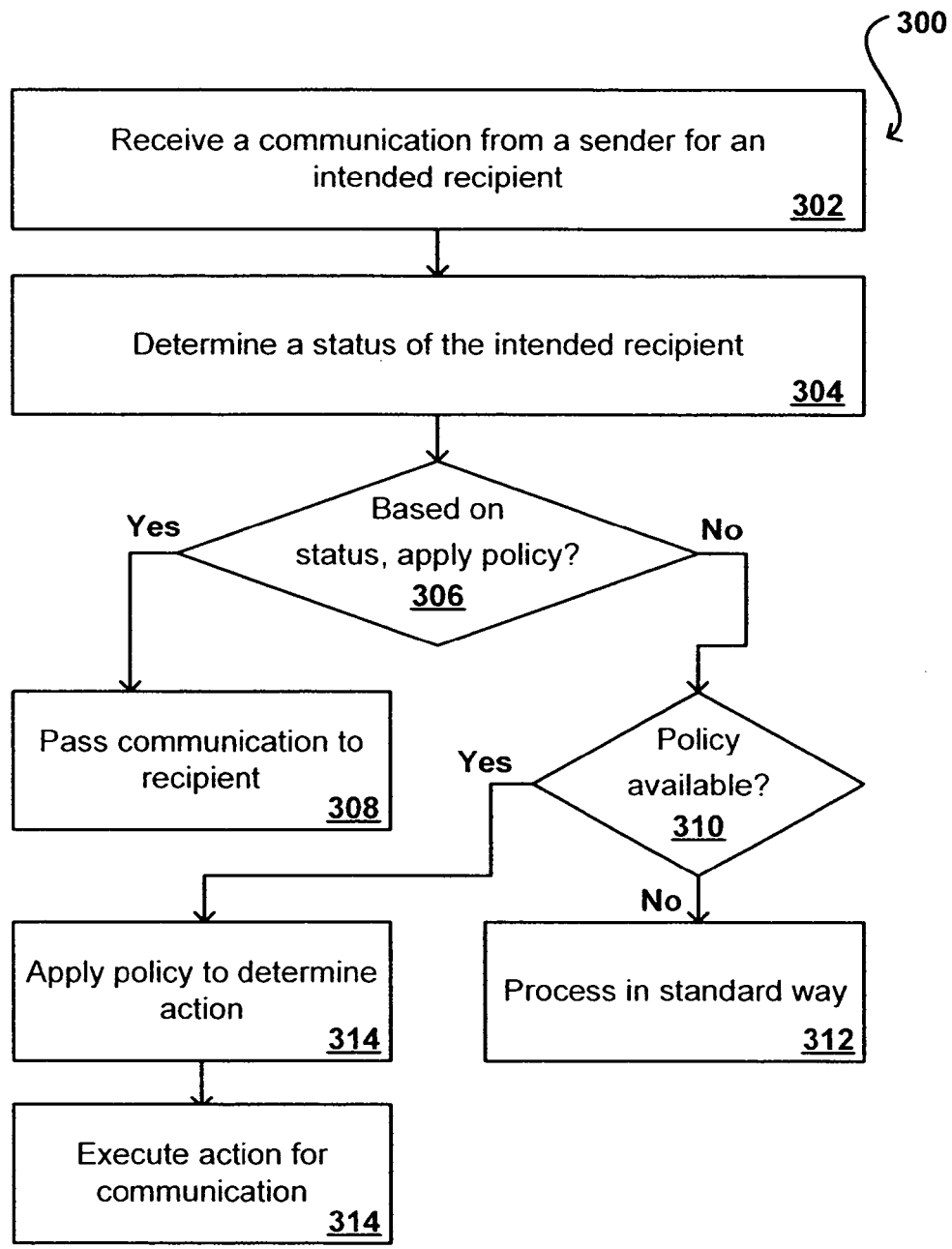
FIG. 3 depicts a simplified flowchart of a method for applying policies to instant messages in accordance with one embodiment of the present invention.

FIG. 3 depicts a simplified flowchart 300 of a method for applying policies to communications in accordance with one embodiment. In the method, a communication is received from a sender for a recipient 302. The receipt can be by a server and/or client for the recipient, which can include a policy enforcer as discussed above. The status of the intended recipient of the communication is determined 304. For example, if the status is offline, idle, any other status that indicates the recipient is not present, then this may indicate that a policy is to be applied. A determination then is made as to whether a policy should be applied for the current status of the recipient 306. If a policy should not be used, the communication is passed on to the recipient 308. If a policy should be used, a determination is made as to whether an appropriate policy is available for the recipient 310, as not all users may have specified policies.

If a policy is not available, the communication can be processed in a standard way based solely on the status 312. For example, conventional methods may provide a message based on the status, where a message is sent to the sender stating that the intended recipient is away from the computer or that message is being cached. If a policy is available, the policy is applied to the communication to determine the appropriate action to execute 314. As described above, a set of conditions may be applied to information determined in a logical manner in order to determine the appropriate action (s). In one embodiment, the information that is applied to the policies may include information other than the status of the user. The appropriate action for the communication then is performed 316. This can include any of the actions described or suggested elsewhere herein.

Figure 4:
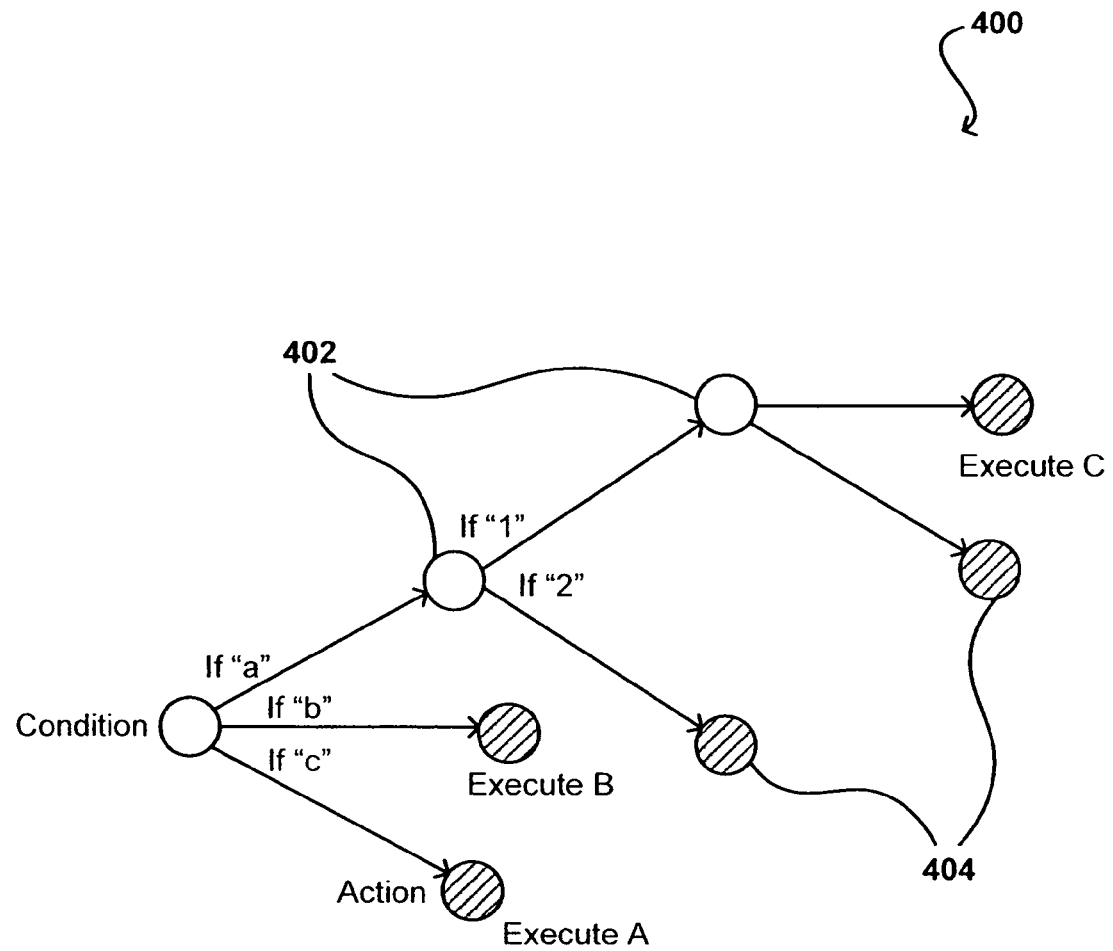
FIG. 4 illustrates the flow of a policy that can be used in accordance with one embodiment of the present invention.

FIG. 4 illustrates the flow of an exemplary policy 400. As shown, various conditions 402 and actions 404 are provided. The policy can be a simple file that contains a flow of conditions followed by explicit actions. The file can be any appropriate file, such as an XML rule set, BPRL file, or file in any appropriate programming language. In the policy, a flow of conditions is followed until the appropriate action to execute is determined. Methods for implementing policies and decision trees are well known in the art and will not be discussed herein in detail.

Embodiments of the present invention provide many advantages. For example, a user personalizable policy may be provided that can be applied to instant messages. The conditions of the policy may be flexible and may include conditions that are based on information other than just solely the status of a recipient. Also, other actions may be provided that may be used by a user in order to facilitate communications with the sender. For example, other avenues of contacting the recipient may be provided and also personalized based on the sender. Accordingly, a more flexible, powerful and intelligent solution for instant messaging is provided. This solution may be provided not only when a user is absent, but also when a user is effectively instant messaging with a sender. For example, messages may be cached based on a policy.

Figure 5:
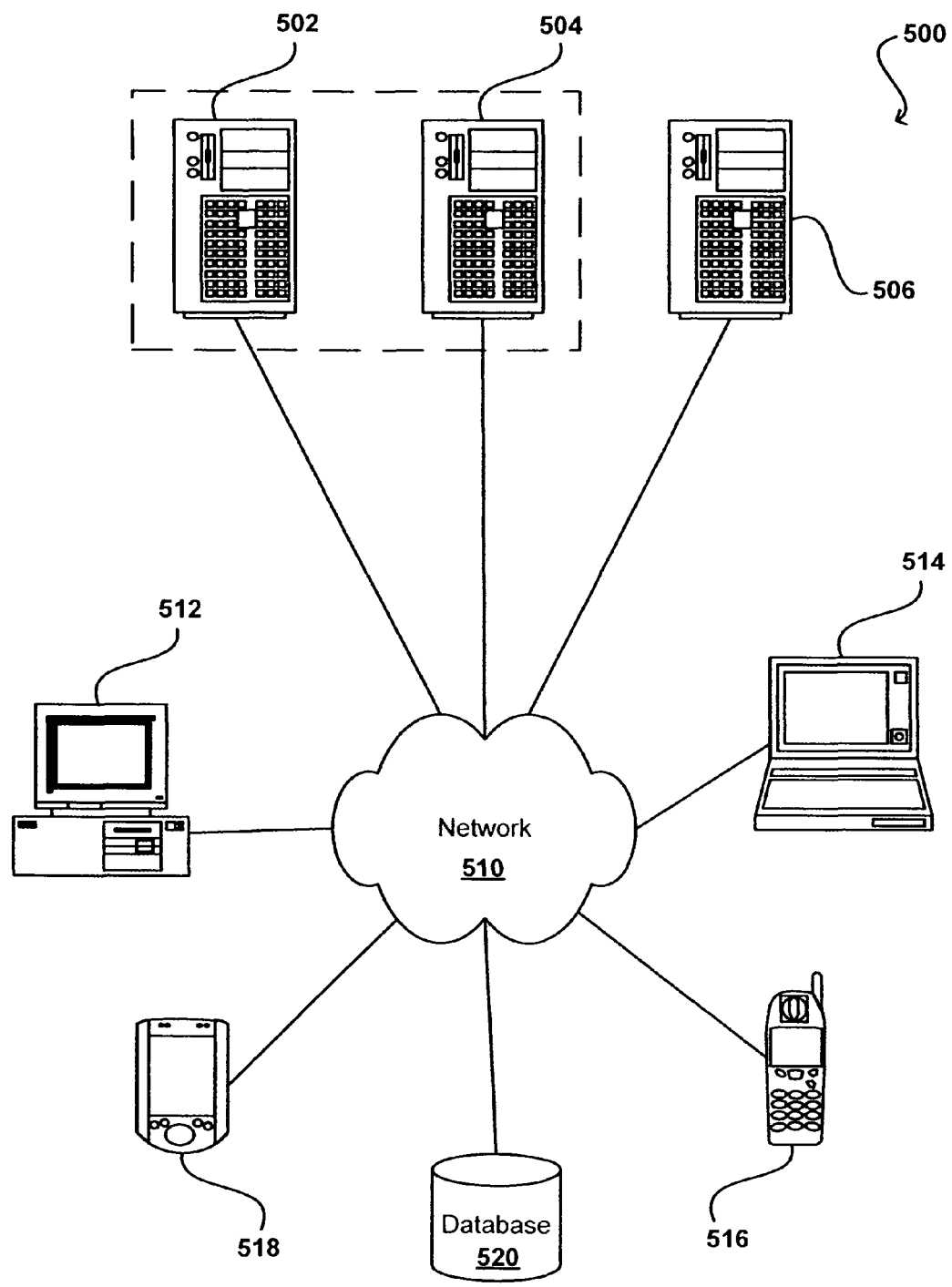
FIG. 5 illustrates components of a computer network that can be used in accordance with one embodiment of the present invention.

FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10g, that is adapted to store, update, and retrieve data in response to SQL-formatted commands.

Figure 6:
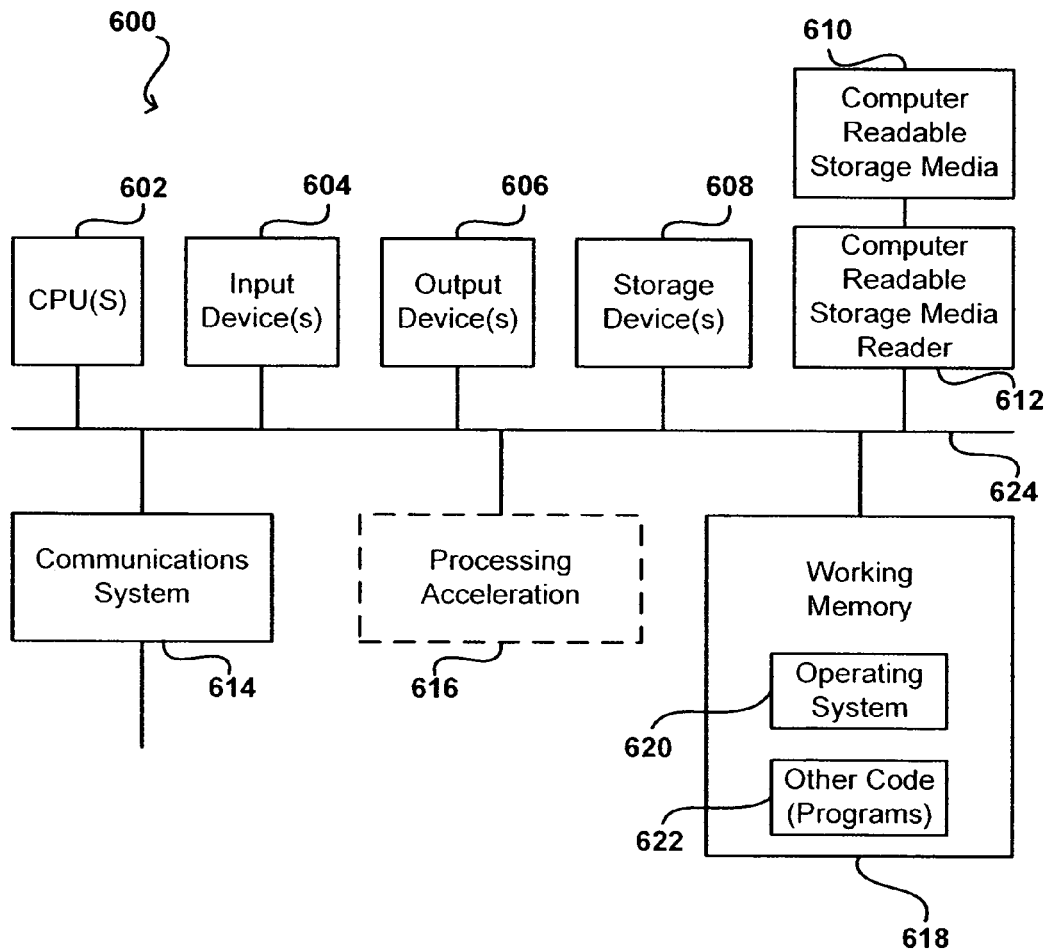
FIG. 6 illustrates components of a computerized device that can be used in accordance with one embodiment of the present invention.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for applying a policy to a communication, comprising:
   receiving a communication for an intended recipient client by a communication system from a sending client via a first channel of a plurality of communication channels;
   analyzing information for the communication with a policy enforcer executed by the communication system;
   determining by the communication system a status of the intended recipient client;
   determining by the communication system whether to apply a policy to the communication based on the status of the intended recipient client and said analyzing the information for the communication including at least one of an identity of a sender of the communication, a time of day of the communication, and content of the communication, wherein the action includes sending a subsequent communication to the sending client with information determined based on the at least one satisfied condition and wherein information for the subsequent communication includes at least one of a time, sender identity, recipient identity, target, and content of the communication, preference information for the intended recipient, and privacy information for the intended recipient; and
   in response to determining that a policy is to be applied, performing with the policy enforcer the steps of:
      selecting a policy to apply to the communication, the policy including at least one condition and at least one action,
      applying the policy to the communication whereby at least one condition is satisfied, and
      executing the action corresponding to the satisfied condition; and
   in response to determining that a policy is not to be applied, forwarding the communication from the communication system to the intended recipient client via the first channel without applying any policy by the communication system.

2. A method according to claim 1, wherein:
   the communication is selected from the group consisting of an instant message, e-mail, short messaging service (SMS) communication, multimedia messaging service (MMS) communication, voicemail, Push to Talk (PTT) communication, Push to Talk Over Cellular (PoC) communication, chat communication, voice chat communication, video chat communication, Web conferencing communication, push e-mail, phone call, voice call, multimedia call, fax, and multimedia conferencing communication.

3. A method according to claim 1, wherein:
   applying the policy includes evaluating one of the at least one conditions.

4. The method of claim 1, wherein:
   the policy is to be applied when the status of the intended recipient client is one of unavailable, offline, disconnected, or away.

5. The method of claim 1, wherein:
   the action includes sending a subsequent communication using a second channel of the plurality of channels wherein the second channel is different from the first channel and the action further comprises transcoding the communication.

6. The method of claim 1, further comprising:
   allowing the intended recipient to specify the at least one condition and at least one action.

7. The method of claim 1, wherein the communication system comprises a server.

8. A system for applying a policy to a communication, comprising:
   a plurality of communication channels, each of the communication channels of a different type;
   a communication component for receiving from a sending client a communication to an intended recipient client via at least one of the plurality of communication channels;
   a policy storage component of the communication component storing at least one policy capable of being applied to the communication, the policy including at least one condition and at least one action, wherein the action includes sending a subsequent communication to the sending client with information determined based on the at least one satisfied condition and wherein information for the subsequent communication includes at least one of a time, sender identity, recipient identity, target, and content of the communication, preference information for the intended recipient, and privacy information for the intended recipient; and a policy enforcer of the communication component operable to analyze information for the communication, determine a status of the intended recipient client, and determine whether to apply a policy to the communication, the policy enforcer being further operable to select a policy from the policy storage based on the status of the intended recipient client and said analyzing the information for the communication including at least one of an identity of a sender of the communication, a time of day of the communication, and content of the communication, in response to determining that a policy is to be applied, and apply the selected policy to the communication whereby at least one condition is satisfied, the policy enforcer being further operable to execute the action corresponding to the satisfied condition, and the policy enforcer being further operable to forward the communication to the intended recipient client without applying any policy by the policy enforcer in response to determining that the policy is not to be applied.

9. A system according to claim 8, further comprising:
a policy manager allowing the intended recipient client of the communication to manage the at least one policy in the policy storage component.

10. A system according to claim 9, wherein:
the policy manager allows the intended recipient client to specify the at least one condition and at least one action for each policy in the policy storage component.

11. A system according to claim 8, wherein:
the communication is selected from the group consisting of an instant message, e-mail, short messaging service (SMS) communication, multimedia messaging service (MMS) communication, voicemail, Push to Talk (PTT) communication, Push to Talk Over Cellular (PoC) communication, chat communication, voice chat communication, video chat communication, Web conferencing communication, push e-mail, phone call, voice call, multimedia call, fax, and multimedia conferencing communication.

12. The system of claim 8, wherein the communication component executing the policy enforcer comprises a server.

13. A computer-readable memory having stored thereon a computer-readable program that, when executed by a computer, causes the computer to apply a policy to a communication by:
receiving a communication for an intended recipient client at a communication component from a sending client via at least one of a plurality of communication channels;
analyzing information for the communication with a policy enforcer;
determining a status of the intended recipient client;
determining whether to apply a policy to the communication based on the status of the intended recipient client and said analyzing the information for the communication including at least one of an identity of a sender of the communication, a time of day of the communication, and content of the communication, wherein the action includes sending a subsequent communication to the sending client with information determined based on the at least one satisfied condition and wherein information for the subsequent communication includes at least one of a time, sender identity, recipient identity, target, and content of the communication, preference information for the intended recipient, and privacy information for the intended recipient;
in response to determining a policy is to be applied, selecting with the policy enforcer a policy to apply to the communication, the policy including at least one condition and at least one action, applying the policy to the communication with the policy enforcer whereby at least one condition is satisfied, and executing the action corresponding to the satisfied condition with the policy enforcer; and
in response to determining a policy is not to be applied, forwarding the communication to the intended recipient client from the communication component without applying any policy.

\* \* \* \* \*

UNITED STATES PATENT AND TRADEMARK OFFICE
CERTIFICATE OF CORRECTION

| | | |
|---|---|---|
| PATENT NO. | : 7,996,467 B2 | Page 1 of 1 |
| APPLICATION NO. | : 11/512613 | |
| DATED | : August 9, 2011 | |
| INVENTOR(S) | : Maes | |

It is certified that error appears in the above-identified patent and that said Letters Patent is hereby corrected as shown below:

On sheet 3 of 6, in figure 3, Below Reference Numeral 314, line 3, below "communication" delete "314" and insert -- 316 --, therefor.

Signed and Sealed this
Twenty-first Day of August, 2012

David J. Kappos
*Director of the United States Patent and Trademark Office*